US007028469B2

(12) United States Patent
Porskrog et al.

(10) Patent No.: US 7,028,469 B2
(45) Date of Patent: Apr. 18, 2006

(54) LEAKAGE COMPENSATION ARRANGEMENT IN A CONTROL DEVICE FOR A FULLY HYDRAULIC STEERING SYSTEM

(75) Inventors: Bendt Porskrog, Nordborg (DK); Niels Arbjerg, Sydals (DK)

(73) Assignee: Sauer-Danfoss ApS, (DK)

( * ) Notice: Subject to any disclaimer, the term of this patent is extended or adjusted under 35 U.S.C. 154(b) by 120 days.

(21) Appl. No.: 10/673,852

(22) Filed: Sep. 29, 2003

(65) Prior Publication Data

US 2004/0069139 A1 Apr. 15, 2004

(30) Foreign Application Priority Data

Oct. 8, 2002 (DE) ................................ 102 46 882
May 9, 2003 (DE) ................................ 103 21 109

(51) Int. Cl.
*F16D 31/02* (2006.01)

(52) U.S. Cl. .......................................... 60/384; 60/387

(58) Field of Classification Search .................. 60/384, 60/387

See application file for complete search history.

(56) References Cited

U.S. PATENT DOCUMENTS 4,759,182 A 7/1988 Haarstad
5,263,321 A 11/1993 Thomsen et al.
5,819,532 A * 10/1998 Wang et al. .................. 60/384
5,960,694 A 10/1999 Thomas et al.
6,318,078 B1 * 11/2001 Novacek et al. .............. 60/384
6,769,249 B1 * 8/2004 Novacek ...................... 60/384

FOREIGN PATENT DOCUMENTS

DE 4042151 11/1993
WO WO 0160681 8/2001

* cited by examiner

*Primary Examiner*—F. Daniel Lopez

(57) ABSTRACT

A leakage compensation system in a control device (S) has a fully hydraulic steering system (1) with a supply connection arrangement having a high-pressure connection (P) and a low-pressure connection (T). A working connection arrangement has two working connections (CL, CR), a control section between the supply connection arrangement (P, T) and the working connection arrangement (CL, CR). A control element (2) for activating the control section, a steering member (3) and an auxiliary fluid path (12) has a valve arrangement (A6, A7), through which hydraulic fluid can be supplied or drained off.

18 Claims, 8 Drawing Sheets

LEAKAGE COMPENSATION ARRANGEMENT IN A CONTROL DEVICE FOR A FULLY HYDRAULIC STEERING SYSTEM

BACKGROUND OF THE INVENTION

The invention relates to a leakage compensation arrangement in a control device for a fully hydraulic steering system with a supply connection arrangement having a high-pressure connection and a low-pressure connection, a working connection arrangement having two working connections, a control section between the supply connection arrangement and the working connection arrangement, a control element for activating the control section, a steering member and an auxiliary fluid path with a valve arrangement, through which hydraulic fluid can be supplied or drained off.

A control device of this general kind is known from DE 40 42 151 A1.

In a fully hydraulic steering system, there is no direct active mechanical connection between the control element, for example a steering handwheel, and the steering member, for example the steered wheels or the rudder of a ship. The control of the steering member practically occurs exclusively by means of a hydraulic fluid, which is supplied to a motor via the control section. Thus, the control section firstly controls the direction, in which the steering member is moved. This direction is determined by the movement direction of the control element. Secondly, the control section usually also controls the extension of the movement of the steering member.

Due to unavoidable tolerances in the control device, which are required to ensure that the various parts of the control device can move in relation to each other, inner leakages occur. Because of the inflow or outflow of hydraulic fluid, the allocation of control element and steering member in relation to each other is displaced. This may cause that one position of a steering handwheel, which is at a certain time allocated to straight-ahead driving, will eventually cause a curve driving.

Usually, the person operating the control device will compensate this error. Normally, such an operating person does not steer according to the position of the control element, but according to feeling. Still, however, a certain correlation between the position of the control element and the position of the steering member is desired, particularly when further operating elements are arranged on the control element, for example switches for activating further functions of a vehicle to be controlled by the control device. When these switches move out of the reach of the operating person, this is regarded as disturbing.

In the control device known from DE 40 42 151 A1, valves have therefore been arranged in the auxiliary fluid path, via which hydraulic fluid can be supplied or drained off. For controlling the valves, a control is provided, which is connected with two sensors. One sensor monitors the position of the control element. The other sensor monitors the position of the steering member. When both positions do not correlate with each other, a valve is activated to supply or drain off hydraulic fluid, until the correlation has been achieved again. Even though this procedure has proved its worth, it is relatively expensive.

A similar control device is known from U.S. Pat. No. 5,267,628. Also this document shows an electronic solution, which is expensive to manufacture and difficult to mount.

SUMMARY OF THE INVENTION

The invention is based on the task of providing, in a simple manner, a correction of the correlation between the position of the control element and the position of the steering member.

With a control device as mentioned in the introduction, this task is solved in that the valve arrangement of the auxiliary fluid path can be activated via the control element.

Thus, additional means are no longer required to activate the valve arrangement to supply or drain off hydraulic fluid. The valve arrangement is activated via the control element, that is, the operating person, for example the driver of a vehicle, is responsible for ensuring the correlation between the control element and the steering member. This gives the additional advantage that such a correction is actually initiated by the operating person.

Preferably, in a predetermined operating area of the control element outside the neutral position of the control element, the valve arrangement enables a correction of a correlation between the position of the control element and the position of the steering member. In this connection, the neutral position is the position, in which the steering member is not activated. Simply, the neutral position of the control element is the position, in which the vehicle drives straight ahead. Thus, a correction can only be made, when the control element is deflected. Only in this case, the valve arrangement is activated, for example are individual fluid paths for the hydraulic fluid released or closed by the valve arrangement.

Also, the valve arrangement prevents a correction via the auxiliary fluid path in a predetermined operating end area of the control element. This is particularly the case in connection with control elements, which are made as steering handwheels. Next to the activation of the control section with the purpose of changing the direction of the vehicle, the steering handwheel also has the function, during failures, of serving as a drive for the emergency steering pump, which is formed by the control section. In this case, the valve arrangement must prevent hydraulic fluid from being supplied or drained off via the auxiliary fluid path. The complete amount of hydraulic fluid transported through the emergency steering pump must be available for the activation of the steering member. The correction possibility through the valve arrangement in the auxiliary fluid path can thus be limited to a relatively small area, for example an area from 2 to 8° when using a steering handwheel as control element, that is, the steering handwheel is activated so that, for example, an inner control slide turns in relation to an outer control slide in an area from 2 to 8°, so that hydraulic fluid can be supplied or drained off, to enable a correlation between the position of the control element and the position of the steering member. The same applies when using other control elements.

Further, the valve arrangement is made in the control section. This keeps the manufacturing costs low. The required activation of the valve arrangement can be ensured in the control section without further effort. Fluid paths are easy to make.

It is particularly preferred that the valve arrangement has at least one adjustable throttling arrangement in the control section. In the control section a number of throttles is available anyway, which control the flow of the hydraulic fluid between the supply connection arrangement and the working connection arrangement. It is now simple to provide further throttles in the control section, which open or close the auxiliary fluid path when activating the control section by means of the control element.

Also, the control section has a housing, an outer rotary slide arranged to be rotatable in the housing and an inner rotary slide arranged to be rotatable in the outer rotary slide, the throttling arrangement being formed between the inner and the outer rotary slide and/or between the outer rotary slide and the housing. A control section with two rotary slides in the housing is known per se in fully hydraulic steering systems. Usually, the inner rotary slide follows the rotation of the steering handwheel, and the rotation of the inner rotary slide is transferred to the outer rotary slide via a set of springs. A cardan shaft transfers the rotation of the outer rotary slide to the inner gear wheel of a gear wheel set, which serves as measuring motor. Thus, an amount of hydraulic fluid can be supplied to the steering member, which corresponds to the relative deflection of the control element.

Now, in a simple manner, additional throttles can be provided on the inner rotary slide, on the outer rotary slide and on the housing, which throttles control the auxiliary fluid path. These throttles can open the auxiliary fluid path in a relatively small angle area of the relatively rotation between the inner and the outer rotary slide, so that in this angle area a correction of the positions of the control element and the steering member is possible. When the throttles are formed between the outer rotary slide and the housing, the rotating angle can also be larger. In the remaining rotating angle area, however, the only purpose of the activation of the control element is to deflect the steering member in the desired direction.

Further, the throttling arrangement has several throttles connected in series. Thus, different components can be used for forming the throttles. In particular, it is no longer necessary to provide fine structures. When a higher throttling resistance is required, this can be realised without large difficulties by means of an accordingly designed series connection.

Also, at least one of the several throttles is made as a fixed throttle. The fixed throttle limits the flow of hydraulic fluid into or out of the auxiliary fluid path. It can be replaceable, so that the permissible or maximum possible flow can be adapted in a simple manner to certain applications.

In addition, one throttle is arranged between the inner and the outer rotary slide and one throttle between the outer rotary slide and the housing. For example, the throttle between the inner and the outer rotary slide can then be used to open the correction possibility for a relatively small angle area. The throttle between the outer rotary slide and the housing enables a flow for a longer period, however with an increasingly reduced amount.

Preferably, for each rotation direction the outer rotary slide has a throttling groove, which extends over part of its circumference and overlaps with both the opening of a working connection and the opening of the low-pressure connection, whereas the remaining part of the circumference has an auxiliary groove, which is offset laterally in relation to the throttling groove and only overlaps with the opening of the working connection. On the part of the circumference, on which the throttling groove overlaps with the opening of the working connection and with the opening of the low-pressure connection, a fluid flow from the working connection to the low-pressure connection, for example, a tank connection, is possible. In this connection, the auxiliary groove produces a substantial material symmetry in the outer slide. Next to the material symmetry, it is achieved that the pressure conditions around the slide are substantially uniform. It must be observed that naturally a throttling groove is provided for each rotation direction, the throttling grooves for different rotation directions being offset in the axial direction in relation to each other.

The outer slide is surrounded by a circumferential groove, which is supplied with the pressure at the working connection. The circumferential groove contributes further to the pressure balance over the outer slide. This again reduces the risk of a jamming of the outer slide and the inner slide due to a deformation of the outer slide. A play between the outer slide and the inner slide can thus be kept small, which again reduces the risk of leakages. Of course each rotation direction can have its own circumferential groove.

For each rotation direction a projecting area is provided on the circumference of the outer rotary slide, said projecting area being surrounded by the circumferential groove, the throttling groove and the auxiliary groove, an angle area of the outer rotary slide being provided, in which both projecting areas interrupt a connection between the low-pressure connection and the working connection. In this angle area a correction of the correlations between the positions of the control element and the steering member is thus not possible.

The auxiliary fluid path is arranged between the working connection arrangement and the low-pressure connection. In this case, a correction of the correlation between the control element and the steering member occurs in that hydraulic fluid can flow off from the control device. When the operating person wants to perform a correction, he operates the control element slightly, that is, he merely turns the steering handwheel by a small angle area. In other words, the inner rotary slide is displaced by a small angle area in relation to the outer rotary slide, to perform the correction. In order to maintain this relative turning, the steering handwheel can currently be further turned, so that eventually, as a sum, also a larger rotation angle can be achieved. This does not change the position of the steering member. The hydraulic fluid flowing through the control section flows off direct to the low-pressure connection via the valve arrangement. Thus, the steering handwheel can eventually be turned to the desired position, without at the same time causing a corresponding direction change of the vehicle. The correction can also be made while driving. When during driving a direction correction is required, it is merely necessary to turn the steering handwheel on by a small angle, after which the steering member will immediately respond. In this case the correction is interrupted. However, the steering behaviour of the vehicle has of course a higher priority.

In another, preferred embodiment it is provided that the auxiliary fluid path is arranged between the working connection arrangement and an auxiliary low-pressure connection provided separately from the low-pressure connection. Thus, it is absolutely possible, instead of an inner connection to the low-pressure connection, for example the tank connection, to connect an outer connection directly with the tank. Otherwise, the function is the same. In a small rotation angle area of the steering handwheel, hydraulic fluid transported through the control section can flow off directly to the tank without activating the steering member.

While the two alternatives mentioned above form passive slip compensation, another preferred embodiment provides that the auxiliary fluid path is provided between the high-pressure connection and the working connection arrangement and bypasses the control section. In this case, additional fluid is led to the steering member from the high-pressure connection, when the control element is activated.

In this case, the correction occurs in that the steering member is made to follow the control element.

Finally, it is also possible that one of the two rotary slides has a cam arrangement, which acts upon a valve. The valve can be a discrete or built-in valve. For example, the use of a non-return valve is possible. However, the working principle remains the same.

In the preferred embodiment, it is provided that the auxiliary fluid path have an inlet, which is connected directly with the outlet of a priority valve or with a pump, and an outlet, which is connected with the working connection arrangement. In this case, the correction is an "active" correction, that is, when activating the control element, additional fluid is led to the steering member. Thus, the correction occurs in that the steering member follows the control element. The fact that the auxiliary fluid path is connected directly with the priority valve causes that the hydraulic fluid is led to the auxiliary fluid path practically without pressure loss, that is, already during idling, the auxiliary fluid path practically receives the full pressure from the outlet of the priority valve. Thus, the auxiliary fluid path is supplied without pressure loss. Thus, the auxiliary fluid path is supplied without pressure loss. This causes that a sufficient pressure is available in the auxiliary fluid path, so that a supply of hydraulic fluid through the auxiliary fluid path is also possible, when hydraulic fluid is already supplied through the control section.

Also, the valve arrangement has a non-return valve opening in the direction away from the priority valve. This non-return valve may be provided additionally to or instead of a throttle and ensures that in certain operating situations the auxiliary fluid path remains closed. This particularly applies, when the measuring motor in the control device is to be used as emergency steering pump. In this case, the non-return valve prevents hydraulic fluid from flowing off to the high-pressure connection via the auxiliary fluid path.

In the following, the invention is described in detail on the basis of preferred embodiments in connection with the drawings, showing:

BRIEF DESCRIPTION OF THE DRAWINGS

FIGS. 6, 6*a*, 6*b*, and 6*c* are sequential cross sectional views showing the valve arrangement of this invention.

BRIEF DESCRIPTION OF THE DRAWINGS

Figure 1:
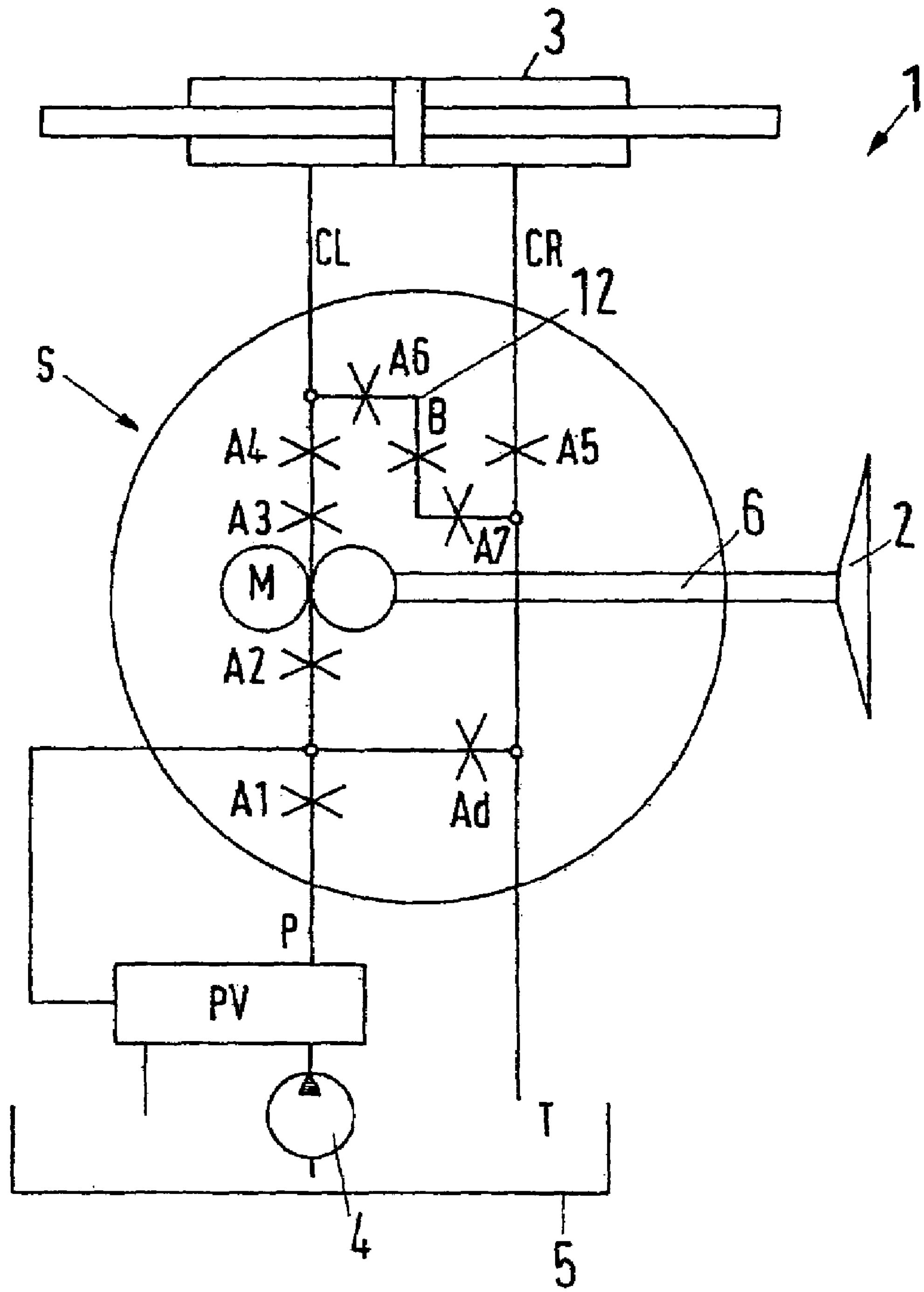
FIG. 1 is a schematic drawing of the hydraulic steering system with a first embodiment of a control device of this invention.

FIG. 1 shows a fully hydraulic steering system 1 with a control element, here in the form of a steering handwheel 2, a steering member, here in the form of a steering motor 3, and a control device S. The control device S has a working connection arrangement with two working connections CL, CR, which are connected with the steering motor 3. Depending of the desired direction and deflection, the steering motor 3 receives a certain amount of hydraulic fluid via the working connections CL, CR.

Further, the control device S has a supply connection arrangement with a high-pressure connection P and a low-pressure connection T. Via a priority valve PV the high-pressure connection P is connected with a pump 4. The low-pressure connection T is connected with a tank 5. Accordingly, the high-pressure connection P is sometimes called "pump connection" and the low-pressure connection T "tank connection".

Via a shaft 6, the steering handwheel 2 is connected with a control section of the control device S, which has a measuring motor M and a set of slides (not shown in detail in FIG. 1) with an inner rotary slide, an outer rotary slide and a housing, throttles A1 to A7, Ad being formed by the cooperation of the two slides and the housing.

The throttles A1 to A5 and Ad are known per se. In the neutral position, the throttles A1, A2, A3, A4 and A5 are closed. In the neutral position, Ad is open in the direction of the tank 5. When the steering handwheel 2 is turned, a relative turning between the inner slide and the outer slide occurs. Thus, Ad is closed and the remaining throttles are eventually opened, depending on, among other things, the steering speed.

Due to the required play between the inner movable parts of the control device S, inner leakage paths occur, causing, during steering over the time, a changed position of the steering handwheel 2 at a given position of the steering motor 3.

It is now endeavoured that, within certain tolerances, a specific steering handwheel position can be achieved at constant steering direction, for example straight ahead.

In order to make this possible, another two variable throttles A6, A7 and a fixed throttle B are provided in a connection between the working connection arrangement CL, CR and the low-pressure connection T. The throttles A6, A7 and B are arranged in series. The throttle A7 ensures that a connection from the working connection arrangement CL, CR is only available, when the steering handwheel 2 is turned, that is, when the inner slide is not in the neutral position in relation to the outer slide. However, the throttle A7 interrupts the connection to the tank again, when the inner rotary slide has been turned further in relation to the outer rotary slide, particularly when reaching the end position, to avoid that the emergency steering properties of the control device are affected.

The throttle A6 is physically produced between the outer rotary slide and the surrounding housing.

Figure 6C:
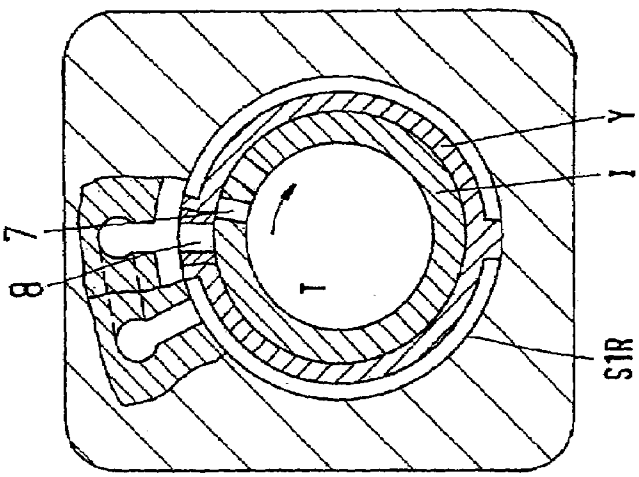

The throttle A7 is explained in detail on the basis of FIG. 6. FIG. 6 shows a housing H, an inner rotary slide I and an outer rotary slide Y. In the inner rotary slide I is provided a bore 7, which, in the neutral position between the inner rotary slide I and the outer rotary slide Y shown in FIG. 6, is covered by the outer rotary slide Y.

Figure 6B:
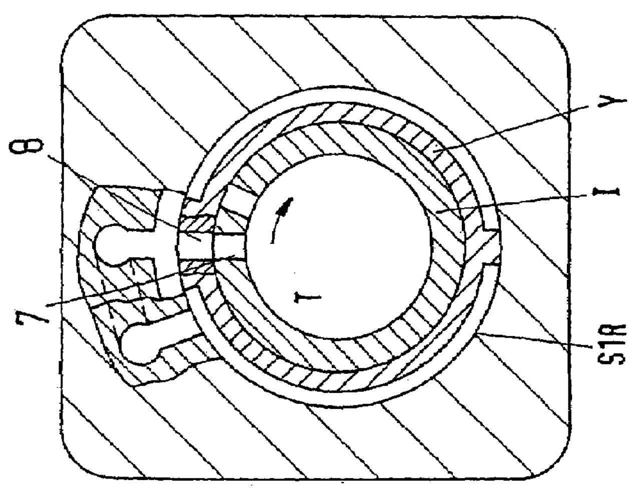
Figure 6A:
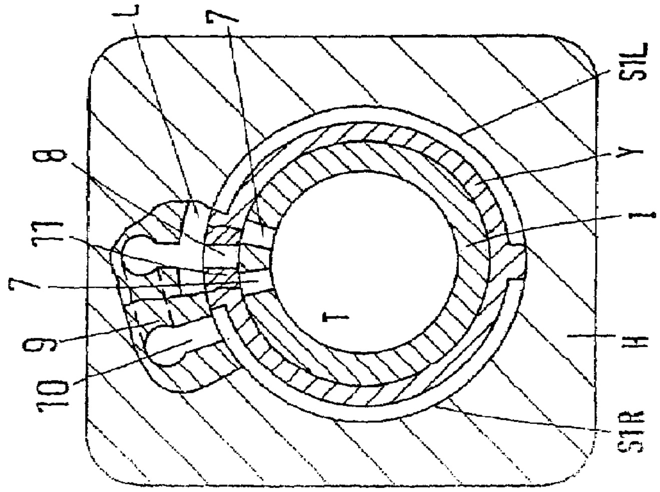

The outer rotary slide Y has a bore 8, which, in the rotary position shown in FIG. 6*a*, overlaps with a recess L in the housing H. Via a housing channel 9, this recess L is connected with a bore 10, which ends in a throttling groove S1R formed on the circumference of the outer rotary slide Y, when the outer rotary slide Y is in the neutral position shown in FIG. 6*a*.

The inside of the inner rotary slide I is connected with the low-pressure connection T, which is shown by the letter T inside the inner rotary slide I.

FIG. 6*b* shows a situation, in which the inner rotary slide I has been turned clockwise by a small angle area in relation to the outer rotary slide Y. Accordingly, the bore 7 inside the inner rotary slide I overlaps the bore 8 of the outer rotary slide Y. A connection exists between the low-pressure connection T and the throttling groove S1R. Accordingly, hydraulic fluid can flow off to the low-pressure connection T from the throttling groove S1R. In this relative rotary position of the inner rotary slide I and the outer rotary slide Y hydraulic fluid, which is supplied from the pump 4 through the throttles A1 to A4 and the measuring section M, can flow off to the low-pressure connection T, that is, the steering handwheel 2 can be turned on maintaining the relative positions of the inner rotary slide I and the outer rotary slide Y, without activating the steering motor 3.

When the inner rotary slide I is turned further in relation to the outer rotary slide Y, the bore 7 in the inner rotary slide I reaches an angle area, in which it no longer overlaps with the bore 8 of the outer rotary slide Y. In this case, the connection between the throttling groove S1R and the low-pressure connection T is interrupted again, that is, in this rotary angle position the normal steering function is ensured. When the steering handwheel is activated, the desired direction change of the vehicle occurs, as the steering motor 3 is activated accordingly.

The angle areas are shown excessively large. A correction possibility exists, for example, only in an area from 2 to 8° of a relative turning between the inner and the outer rotary slide, that is, when the steering handwheel 2 sets a larger relative turning, then a correction is not possible. In the end it depends on, among other things, the speed of the movement of the steering handwheel 2. With a small deflection of the steering handwheel 2, which opens the throttle A7 (Correlation between the bores 7, 8), a further movement of the steering handwheel 2 at a lower speed is possible to cause the correction.

The fact that the throttle A7 interrupts the connection to the low-pressure connection T again, when the inner rotary slide has been turned on in relation to the outer rotary slide, makes it possible to avoid that the emergency steering properties of the control device S are affected.

Physically, the throttle A6 is formed between the outer slide Y and the housing H, namely through the cooperation of the throttling groove S1R with the bore 10. Of course, a corresponding throttling groove S1L for the other steering direction is arranged on the circumference of the outer rotary slide Y. In FIG. 1, this throttling groove S1L is shown in the same level. In fact, however, this throttling groove is offset in the axial direction of the outer rotary slide Y, which will be explained later by means of FIGS. 4 and 5.

The throttle B can be integrated in the throttle A6. However, an insert in the housing can also form it. This is particularly advantageous, when it is desired to use different sizes of throttles B for different applications. The throttle B has a constant opening area. It limits the fluid flow at the working connection arrangement CL, CR to the low-pressure connection T.

The embodiment in FIG. 1 concerns a "passive" compensation, in which hydraulic fluid is discharged from the working connection arrangement CL, CR to the low-pressure connection T via an auxiliary fluid path 12 comprising the throttles A6, A7, B.

Figure 2:
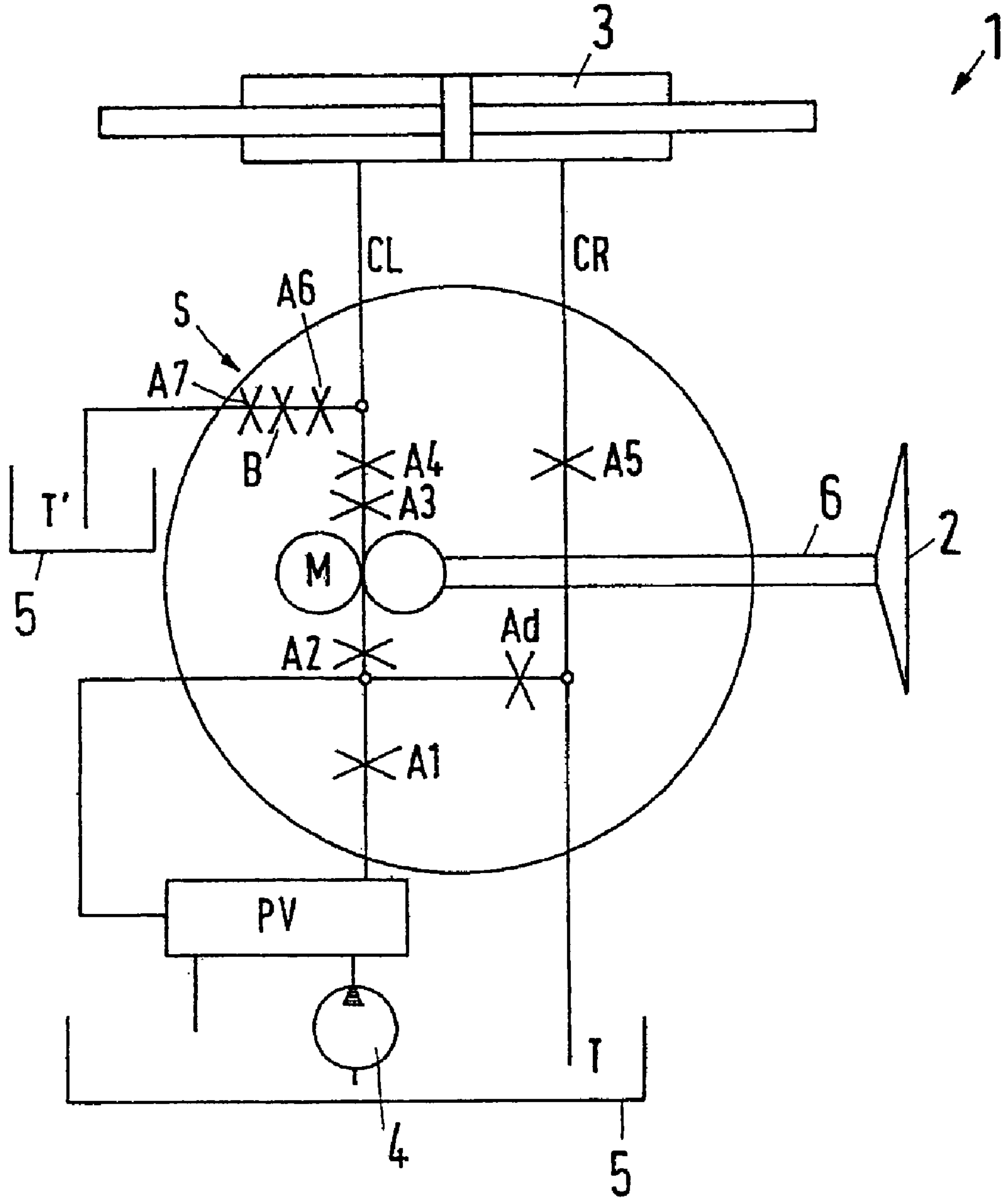
FIG. 2 is a schematic drawing of a second embodiment of the control device.

FIG. 2 shows a modified embodiment, in which a similar arrangement is provided, that is, also a passive compensation. The embodiment according to FIG. 2 differs from the embodiment according to FIG. 1 in that an auxiliary low-pressure connection T' is provided, that is, the throttles A6, A7 are arranged in an outer tank connection. Otherwise, the function principle remains unchanged. In this embodiment, the throttle A7 cannot be integrated in the control unit. It has to be replaced by a unit, which only enables a compensation during straight forward driving, for example a sensor at the steering motor, which opens a valve, or the like.

Figure 3:
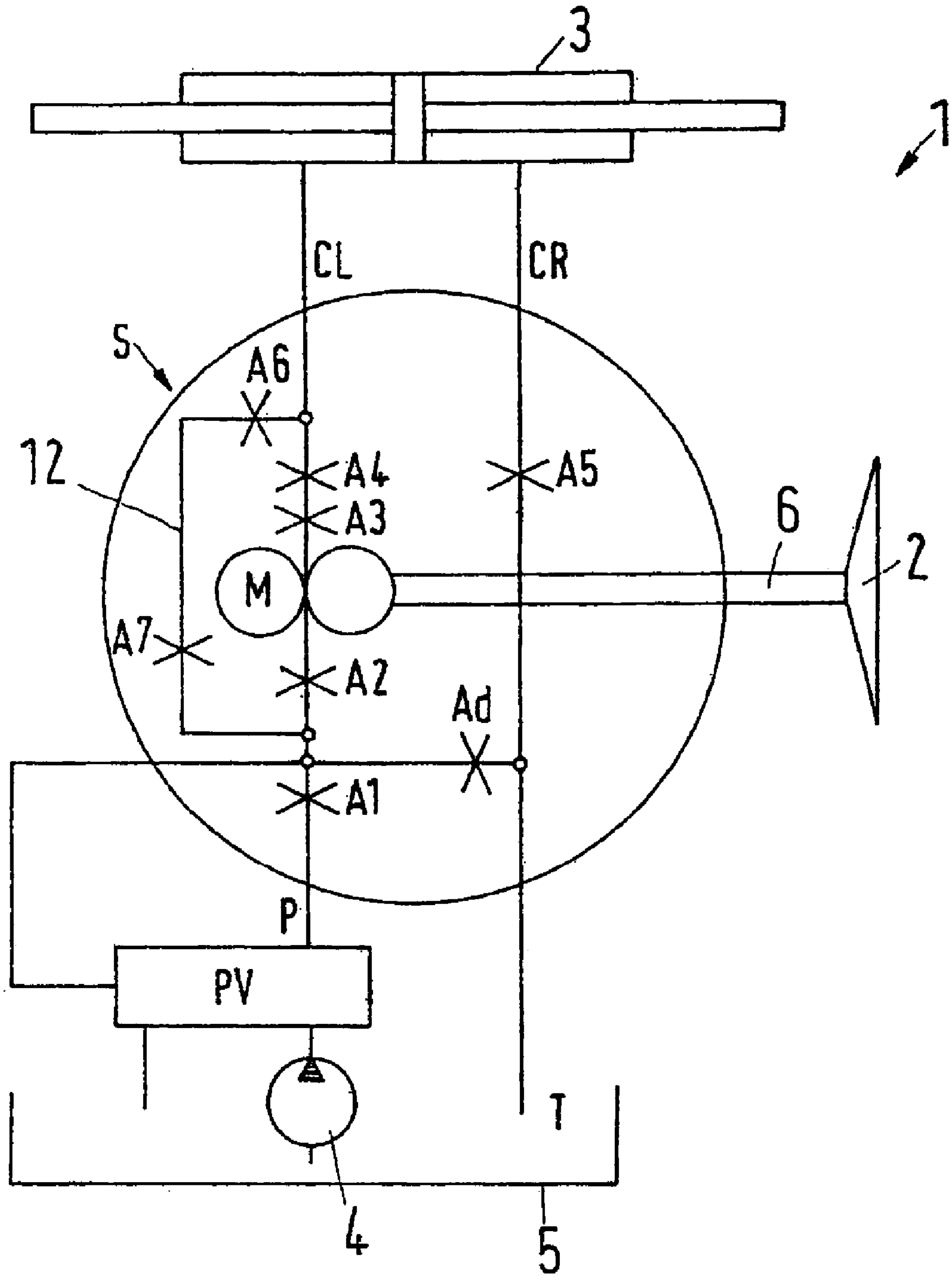
FIG. 3 is a schematic drawing of a third embodiment of the control device.

FIG. 3 shows an embodiment with an "active" compensation. Also here, the throttles A6, A7 are provided, which are realised through the cooperation of the inner rotary slide I, the outer rotary slide Y and the housing H. However, the auxiliary fluid path 12 is provided between the working connection arrangement CL, CR and a point between the two throttles A1, A2. Thus, it bypasses the control section with the throttles A2, A3, A4 and the measuring section M. Under certain circumstances, a fixed throttle B will not be necessary here. Also in the two embodiments according to FIGS. 1 and 2, the fixed throttle B may be unnecessary under certain circumstances.

In the embodiment according to FIG. 3, a movement of the steering motor 3 can be achieved by means of a small turning of the steering handwheel 2. In the normal case, a predetermined turning of the steering handwheel would correspond to predetermined deflection of the steering motor. The auxiliary fluid path 12 with the throttles A6, A7, changes this. In fact, the steering motor 3 could be adjusted at random by the correction movement of the steering handwheel 2.

Figure 4:
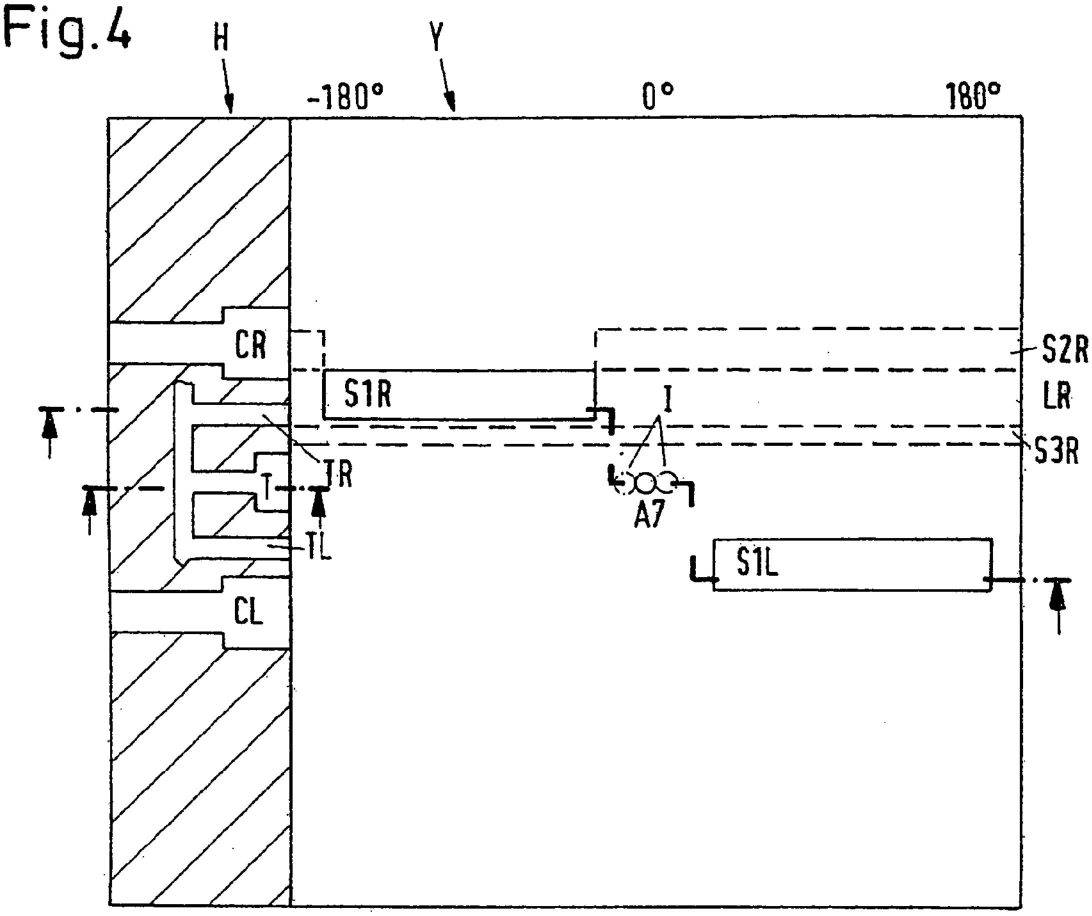
FIG. 4 is a schematic drawing showing the throttling grooves.
Figure 5:
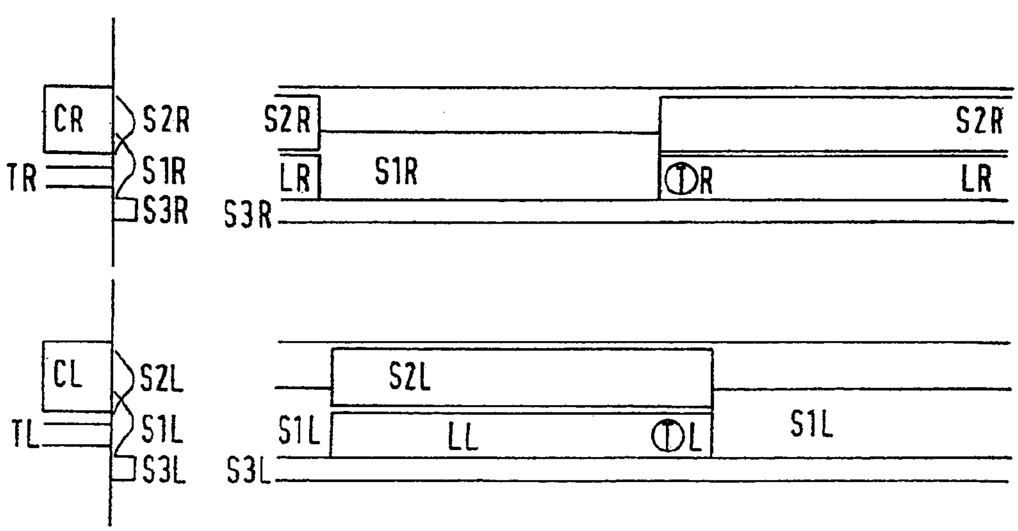
FIG. 5 is a more detailed version of FIG. 4.

FIG. 4 shows an unfolding of the outer rotary slide Y in relation to corresponding areas of the housing H. However, only the grooves required to explain the throttles A6, A7 are shown. For reasons of clarity, all other grooves provided to build the throttles A1 to A5, Ad are not shown. Also, only the grooves are shown, which are provided for a deflection to the right. Merely for information, also the throttling groove S1L is shown, which is provided for a corresponding deflection to the left.

Further to the throttling groove S1R, which permits an overlapping with the low-pressure connection T via a low pressure opening TR and with the working connection CR, an auxiliary groove S2R is provided, which surrounds the remaining circumference of the outer slide Y. This can also be seen from FIG. 5. While the throttling groove S1R causes a connection between the working connection CR and the low-pressure connection T, the auxiliary groove S2R merely extends so far in the axial direction that it only overlaps with the low-pressure opening TR. When thus the outer rotary slide Y has been turned so that the throttling groove S1R no longer overlaps with the connection TR, the connection between the working connection CR and the low pressure connection T is interrupted.

A further circumferential groove S3R is provided, which merely overlaps with the high-pressure connection PR. This circumferential groove S3R is connected with the throttling groove S1R. Thus, it produces pressure balance. Finally, a projecting area LR is provided, which is surrounded by the throttling groove S1R, the auxiliary groove S2R and the circumferential groove S3R. As can be seen from FIG. 5, there is no connection between the working connection CR and TR, that is, the low-pressure connection T, when the projecting area LR overlaps with the bore TR.

Also for the opposite rotation direction, a corresponding projecting area LL is provided, the mutual placing of the two projecting areas being chosen so that they have a common angle area, in which they both close their respective low-pressure connection TR, TL.

Now, the throttling effect of the throttle A7 can be adapted to the outlet throttle A4. Thus, a constant amplification factor can be achieved at least approximately during the compensation period. The compensation period occurs, when an opening through the throttle A6 is available. This is determined by the absolute position of the outer slide Y in the housing H.

Thus, at small corrections, the steering handwheel 2 can travel to the desired position at constant steering direction, for example straight forward driving.

Figure 7:
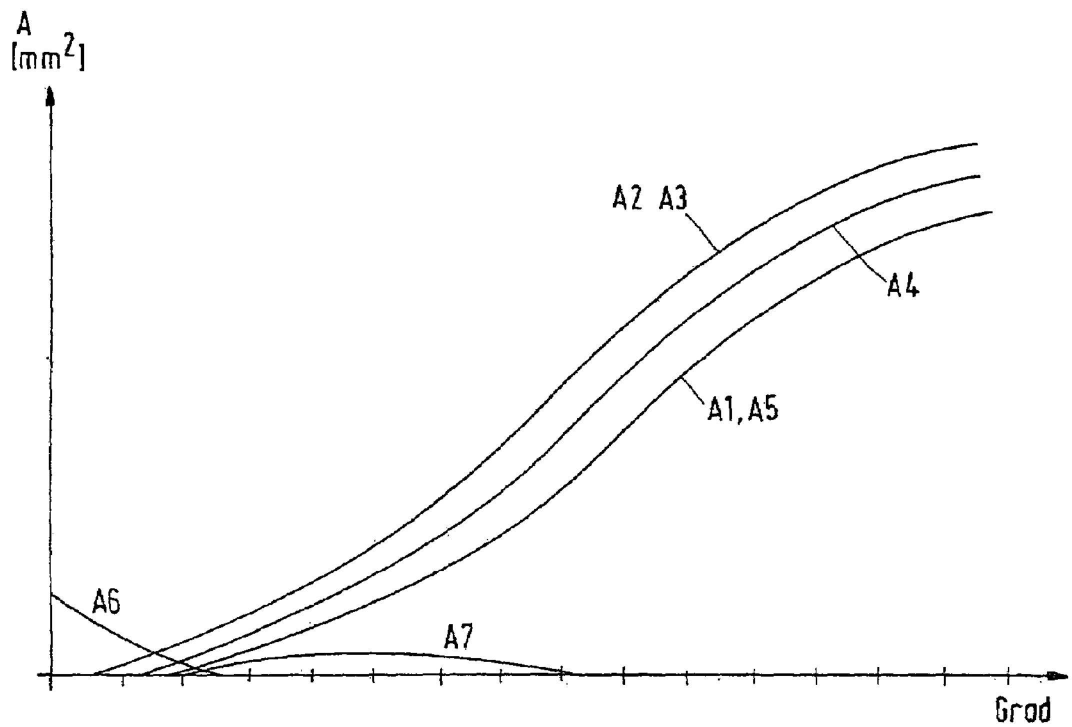
FIG. 7 is a schematic view of the opening operation of the throttles.

FIG. 7 is a schematic view of the course of the sizes of the throttles A1 to A5, Ad and A7, that is, the throttles, which are formed between the inner rotary slide and the outer rotary slide. To the right is shown the relative turning between the two rotary slides in degrees, and upward is shown the opening area in $mm^2$. It can be seen that the throttle A7 only opens in a small area of the relative turning from 2° to 8°, that is, basically, before the other throttles A1 to A5 have reached a "fully" active opening size. The throttle Ad closes approximately at the beginning of the opening of the throttle A7. A small overlap is possible. The throttle A7 opens approximately simultaneously with the throttles A1 and A5.

Figure 8:
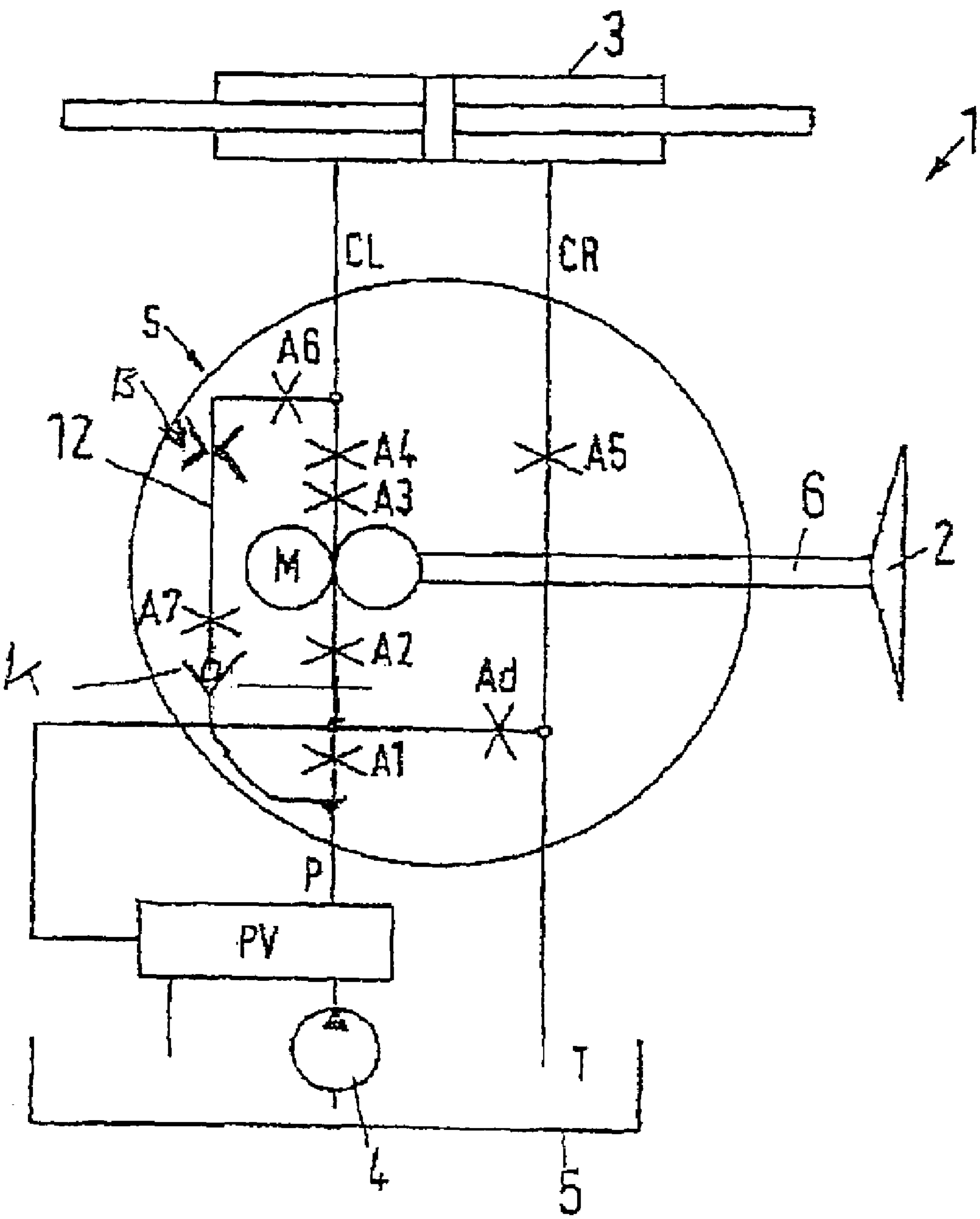
FIG. 8 is a schematic drawing of a fourth embodiment of a control device.

In the embodiment according to FIG. 8, the auxiliary fluid path 12 is provided between the outlet of the priority valve PV and the working connection arrangement, in the present case the working connection CL, in which two variable throttles A6, A7 and a fixed throttle B are arranged in series. The throttles A6, A7 are activated by the steering handwheel, when the steering handwheel 2 leaves the neutral position. For example, an opening of the auxiliary fluid path 12 occurs, when the steering handwheel 2 is in an area, which is from 2° to 8° away from the neutral position. When however, the steering handwheel is turned further, the auxiliary fluid path 12 is closed again.

The fixed throttle B is here intended to be a replaceable part. It must be dimensioned so that the supply of additional hydraulic fluid cannot be felt at the steering handwheel 2. With smaller displacements, for example, a smaller throttle B will be used than with larger displacements.

The throttle A7 can be avoided, when otherwise it is ensured that the throttle A6 is actually only opened in the desired opening area. Such behaviour is more easily achieved with two throttles, as then one opening only appears in an angle area, in which both throttles are open. For example, the throttle A6 can be kept open in the neutral position of the steering handwheel 2 and closed at an angle of 8°, whereas the throttle A7 only starts opening at an angle of 2°. This gives the desired opening area in the angle area from 2° to 8°.

In series with the throttles A6, B and A7 is arranged a non-return valve, which opens away from the priority valve PV. Thus, it is possible to supply the working connection arrangement CL, CR with pressurised hydraulic fluid from the priority valve PV, when the steering handwheel 2 is turned in the small angle area mentioned. When, however, the steering handwheel drives the measuring motor, when here an emergency steering property is required, the hydraulic fluid is not displaced back to the priority valve PV, but can only flow to the steering motor 3.

Under certain circumstances, the non-return valve K can also be avoided, when the throttle A7 has a flow resistance, which is large enough. When the non-return valve K is used, the throttle A7 can be avoided.

In a manner known per se, the throttles A1 to A7 and Ad can be formed with a rotary slide arrangement, which has an inner rotary slide and an outer rotary slide. In the inner rotary slide are provided bores and grooves, which are covered by the outer rotary slide. The outer rotary slide also has bores and grooves, which, on a rotation of the inner rotary slide in relation to the outer rotary slide, partly release and partly cover opening cross-sections. Thus, for example, a constellation can be achieved, with which a small turning of the inner rotary slide in relation to the outer rotary slide will open the throttle A6. A further turning of the inner rotary slide in relation to the outer rotary slide, however, will quickly close this opening again.

Of course, the throttles, for example the throttle A6, can also be formed physically between the outer slide and the housing, in which the outer rotary slide is arranged. Naturally, corresponding throttles are provided for both steering directions, also when FIG. 1 only shows one throttle.

The throttle B is, for example, formed by an insert in the housing. This is particularly advantageous, when it is desired to use different sizes of throttles B for different applications. The throttle B has a constant opening area. It limits the fluid flow from the priority valve PV to the working connection arrangement CL, CR.

With the active compensation shown, a small turning of the steering handwheel 2 causes a movement of the steering motor 3. In the normal case, a predetermined turning of the steering handwheel 2 would also correspond to a predetermined deflection of the steering motor 3. The auxiliary fluid path 12 with the throttles A6, A7, changes this. At small corrections of the steering handwheel, for example in connection with straight forward driving, the steering handwheel will drift in the direction of the "0" position, due to the difference in the amounts of fluid supplied to CL and CR.

This will be explained in detail on the basis of FIG. 9, which in principle corresponds to FIG. 4.

When the inner rotary slide I has been turned clockwise by a small angle area, the bore 7 in the inner rotary slide I will overlap with the bore 8 on the rotary slide Y. There is a connection between the high-pressure connection P and the throttling groove S1R. Accordingly, hydraulic fluid can flow from the high-pressure connection P to the working connection CR via the throttling groove S1R. In this relatively rotation position of the inner rotary slide I and the outer rotary slide Y, hydraulic fluid that is supplied from the pump 4 through the throttles A1 to A4 and the measuring section M can flow to the working connection CR, that is, the steering motor 3 is activated more heavily than anticipated by the steering handwheel 2.

When now, the inner rotary slide I is turned on in relation to the outer rotary slide Y, the connection between the throttling groove S1R and the high-pressure connection P is interrupted again, that is, in this rotation angle position the normal steering function is ensured.

The fact that the throttle A7 interrupts the connection to the high-pressure connection P again, when the inner rotary slide is turned on in relation to the outer rotary slide, causes that the emergency steering properties of the control device S are influenced.

Here, the throttle B limits the fluid flow from the high-pressure connection P to the working connection arrangement CL, CR.

Figure 9:
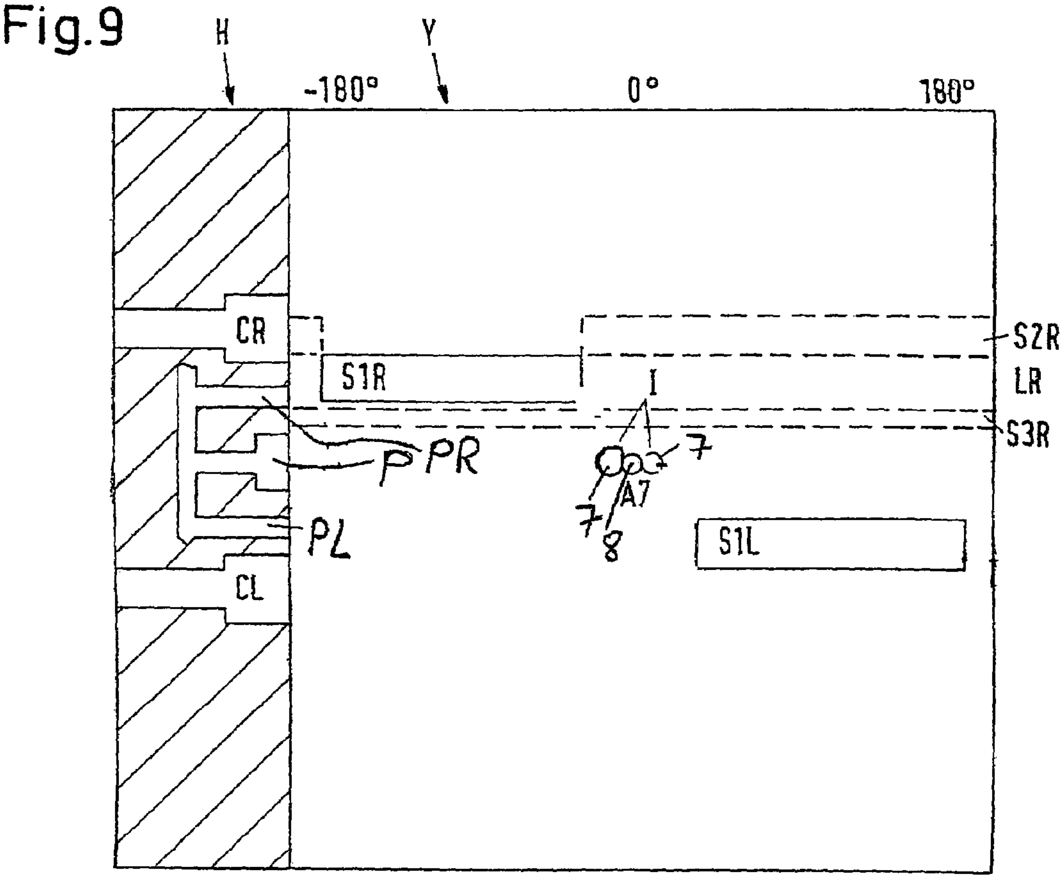
FIG. 9 a schematic view explaining throttling grooves.

FIG. 9 shows an unfolding of the outer rotary slide Y in relation to corresponding areas of the housing H. Next to the throttling groove S1R, which enables an overlap with the high-pressure connection P via high-pressure opening PR and with the working connection CR, the auxiliary groove S2R is provided, which surrounds the remaining circumference of the outer slide Y. While the throttling groove S1R causes a connection between the working connection CR and the high-pressure connection P, the auxiliary groove S2R only extends so far in the axial direction, that it merely overlaps with the working connection CR. Thus, when the outer rotary slide Y has been turned so that the throttling groove no longer overlaps with the connection CR, the connection between the working connection CR and the high-pressure connection P is interrupted.

The additional circumferential groove S3R merely overlaps with the high-pressure opening PR. This circumferential groove S3R is connected with the throttling groove S1R. Thus, it produces a pressure balance. Finally, a projecting area LR is provided, which is surrounded by the throttling groove S1R, the auxiliary groove S2R and the circumferential groove S3R. There is not connection between the working connection CR and PR, that is, the high-pressure connection P, when the projecting area LR overlaps with the bore PR.

Also for the opposite rotation direction a corresponding projecting area LL is provided, the mutual placing of the two projecting areas LR and LL being chosen so that they have a common angle area, in which both simultaneously close their respective high-pressure connection PR, PL.

What is claimed is:

1. Leakage compensation system in a control device for a fully hydraulic steering system with a supply connection arrangement having a high-pressure connection and a low-pressure connection, a working connection arrangement having two working connections, a control section between the supply connection arrangement and the working connection arrangement, a control element for activating the control section, a steering member and an auxiliary fluid path with a valve arrangement, through which hydraulic fluid can be supplied or drained off, characterized in that the valve arrangement (A6, A7) of the auxiliary fluid path (12) can be activated via the control element (2); wherein the leakage compensation system is fully hydraulic; wherein the valve arrangement (A6, A7) of the auxiliary fluid path (12) comprises means for correcting the correlation between the position of the control element (2) and the position of the steering member (3); and wherein the control section has a housing (H), and outer rotary slide (Y) arranged to be rotatable in the housing and an inner rotary slide (I) arranged to be rotatable in the outer rotary slide, wherein the valve arrangement (A6, A7) has a throttle (A6) formed between the outer slide (Y) and the housing (H) through cooperation of a throttling groove (S1R) and a bore (10).

2. The system according to claim 1, characterized in that in a predetermined operating area of the control element (2) outside the neutral position of the control element (2), the valve arrangement (A6, A7) enables a correction of a correlation between the position of the control element (2) and the position of the steering member (3).

3. The system according to claim 1, characterized in that the valve arrangement (A6, A7) prevents a correction via the auxiliary fluid path (12) in a predetermined operating end area of the control element (2).

4. The system according to claim 1, characterized in that the valve arrangement (A6, A7) is made in the control section.

5. The system according to claim 4, characterized in that the valve arrangement (A6, A7) has at least one adjustable throttling arrangement in the control section.

6. The system according to claim 5, characterized in that the throttling arrangement (A6, A7) being formed between the inner and the outer rotary slide, in addition to being between the outer rotary slide (Y) and the housing (H).

7. The system according to claim 5, characterized in that the throttling arrangement has several throttles (A6, A7, B) connected in series.

8. The system according to claim 7, characterized in that at least one of the several throttles (A6, A7, B) is made as a fixed throttle (B).

9. The system according to claim 1, characterized in that the auxiliary fluid path (12) is arranged between the working connection arrangement (CL, CR) and the low-pressure connection (T).

10. The system according to claim 1, characterized in that that the auxiliary fluid path (12) is arranged between the working connection arrangement (CL, CR) and an auxiliary low-pressure connection (T') provided separately from the low-pressure connection (T).

11. The system according to claim 1, characterized in that the auxiliary fluid path (12) is provided between the high-pressure connection and the working connection arrangement (CR, CL) and bypasses the control section.

12. The system according to claim 1, characterized in that the valve arrangement has at least one discretely formed valve, which can be activated via the control element (2).

13. The system according to claim 1, characterized In that the auxiliary fluid path (12) has an inlet, which is connected directly with the outlet of a priority valve (PV) or with a pump (P), and an outlet, which is connected with the working connection arrangement.

14. The system according to claim 1, characterized in that the valve arrangement has a non-return valve opening in the direction away from the priority valve.

15. Leakage compensation system in a control device for a fully hydraulic steering system with a supply connection arrangement having a high-pressure connection and a low-pressure connection, a working connection arrangement having two working connections, a control section between the supply connection arrangement and the working connection arrangement, a control element for activating the control section, a steering member and an auxiliary fluid path with a valve arrangement, through which hydraulic fluid can be supplied or drained off, characterized in that the valve arrangement (A6, A7) of the auxiliary fluid path (12) can be activated via the control element (2); wherein the leakage compensation system is fully hydraulic; wherein the valve arrangement (A6, A7) of the auxiliary fluid path (12) comprises means for correcting the correlation between the position of the control element (2) and the position of the steering member (3) and wherein the valve arrangement (A6, A7) prevents a correction via the auxiliary fluid path (12) in a predetermined operating end area of the control element (2); further characterized in that valve arrangement (A6, A7 is made in the control sections; wherein the control section has a housing, an outer rotary slide arranged to be rotary within the housing, and an inner rotary slide arranged to be rotary within the outer rotary slide; further characterized in that valve arrangement (A6, A7) has at least one adjustable throttling arrangement in the control section; further characterized in that the throttling arrangement has several throttles (A6, A7, B) connected in series; further characterized in that one throttle (A7) is arranged between the inner and the outer rotary slide (I, Y) and one throttle (A6) between the outer rotary slide (Y) and the housing (H).

16. Leakage compensation system in a control device for a fully hydraulic steering system with a supply connection arrangement having a high-pressure connection and a low-pressure connection, a working connection arrangement having two working connections, a control section between the supply connection arrangement and the working connection arrangement, a control element for activating the control section, a steering member and an auxiliary fluid path with a valve arrangement, through which hydraulic fluid can be supplied or drained off, characterized in that the valve arrangement (A6, A7) of the auxiliary fluid path (12) can be activated via the control element (2); wherein the leakage compensation system is fully hydraulic; wherein the valve arrangement (A6, A7) of the auxiliary fluid path (12) comprises means for correcting the correlation between the position of the control element (2) and the position of the steering member (3) and wherein the valve arrangement (A6, A7) prevents a correction via the auxiliary fluid path (12) in a predetermined operating end area of the control element (2); further characterized in that valve arrangement (A6, A7 is made in the control sections; further characterized in that valve arrangement (A6, A7) has at least one adjustable throttling arrangement in the control section; wherein the control section has a housing, an outer rotary slide arranged to be rotary within the housing, and an inner rotary slide arranged to be rotary within the outer rotary slide; further characterized in that the throttling arrangement has several throttles (A6, A7, B) connected in series; further characterized in that for each rotation direction the outer rotary slide (Y) has a throttling groove (S1R, S1L), which extends over part of its circumference and overlaps with both the opening of a working connection (CR, CL) and the opening of the low-pressure connection (TR, TL), whereas the remaining part of the circumference has an auxiliary groove (S2R, S2L), which is offset laterally in relation to the throttling groove (S1R, S1L) and only overlaps with the opening of the working connection (CR, CL).

17. The system according to claim 16, characterized in that the outer slide (Y) is surrounded by a circumferential groove (S3R, S3L), which is supplied with the pressure at the working connection (CL, CR).

18. The system according to claim 17, characterized in that for each rotation direction a projecting area (LR, LL) is provided on the circumference of the outer rotary slide (Y), said projecting area being surrounded by the circumferential groove (S3R, S3L), the throttling groove (S1R, S1L) and the auxiliary groove (S2R, S2L), an angle area of the outer rotary slide (Y) being provided, in which both projecting areas (LR, LL) interrupt a connection between the low-pressure connection (TR, TL) and the working connection (CR, CL).

* * * * *